(12) United States Patent
Shang et al.

(10) Patent No.: US 12,511,038 B2
(45) Date of Patent: Dec. 30, 2025

(54) WRITING MULTIPLE DATA OBJECTS TO OBJECT STORAGE

(71) Applicant: Dell Products, L.P., Round Rock, TX (US)

(72) Inventors: Xiao Le Shang, Shanghai (CN); Wesley Sun, Shanghai (CN); Lu Lei, Shanghai (CN); Heyang Sun, Shanghai (CN); Kalyan C Gunda, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/463,982

(22) Filed: Sep. 8, 2023

(65) Prior Publication Data

US 2025/0085846 A1 Mar. 13, 2025

(51) Int. Cl.
*G06F 3/06* (2006.01)
(52) U.S. Cl.
CPC .......... *G06F 3/0604* (2013.01); *G06F 3/0641* (2013.01); *G06F 3/0659* (2013.01); *G06F 3/067* (2013.01)
(58) Field of Classification Search
CPC .... G06F 3/0604; G06F 3/0641; G06F 3/0659; G06F 3/067
USPC .................................................. 711/154, 100
See application file for complete search history.

(56) References Cited

U.S. PATENT DOCUMENTS

| | | | | |
|---|---|---|---|---|
| 2008/0256254 A1* | 10/2008 | Kim | ..................... | H04N 21/643 709/231 |
| 2010/0333116 A1* | 12/2010 | Prahlad | ................. | G06F 3/0649 713/153 |
| 2011/0196900 A1* | 8/2011 | Drobychev | ........... | G06F 16/122 707/812 |
| 2012/0089481 A1* | 4/2012 | Iozzia | ..................... | H04N 7/16 726/5 |
| 2015/0127619 A1* | 5/2015 | Jarvis | .................. | G06F 16/2246 707/685 |
| 2016/0034549 A1* | 2/2016 | Kesselman | ............. | G06F 16/27 707/626 |
| 2019/0138386 A1* | 5/2019 | Konduru | ............. | G06F 11/1435 |
| 2020/0264775 A1* | 8/2020 | Natanzon | ................ | G06F 3/067 |

* cited by examiner

*Primary Examiner* — Hosain T Alam
*Assistant Examiner* — Zubair Ahmed
(74) *Attorney, Agent, or Firm* — Amin, Turocy & Watson, LLP

(57) ABSTRACT

The technologies described herein are generally directed toward writing multiple data objects to object storage. An example method can include receiving an aggregated data object comprising a set of data objects and metadata corresponding to respective data objects of the set of data objects. The method can further include updating the metadata to comprise the respective storage locations. Further, the method can include updating the metadata to include the respective storage locations. The method can further include allocating the metadata to be stored by metadata processing equipment, resulting in the metadata being stored in metadata storage equipment.

20 Claims, 10 Drawing Sheets

WRITING MULTIPLE DATA OBJECTS TO OBJECT STORAGE

BACKGROUND

Modern data systems can involve the storage and retrieval of many types of data. Different approaches can be used to improve the performance and scalability of different storage systems. In some circumstances, approaches that improve the performance and efficiency of storing some types of data may degrade the performance of storing other types of data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to receive an aggregated data object comprising a set of data objects and metadata corresponding to respective data objects of the set of data objects. The instructions can further include an instruction to store the respective data objects to respective storage locations in a set of data blocks stored in data block storage equipment. Further, the instructions can include an instruction to update the metadata to comprise the respective storage locations. The instructions can further include an instruction to allocate the metadata to be stored by metadata processing equipment, resulting in the metadata being stored in metadata storage equipment.

Additionally, or alternatively, the metadata can include a first offset value for the data objects of the set of data objects within the aggregated data object, and wherein the respective storage locations correspond to respective subsets of the set of data objects. Additionally, or alternatively, the respective storage locations comprise respective second offset values for the respective subsets of data objects.

Additionally, or alternatively, the indication that the processing device separately stored the metadata can include the indication that the processing device separately stored the metadata in a metadata store. Additionally, or alternatively, the indication further can include indications that a data object of the set of data objects was determined to be duplicative of another stored data object, resulting in the data object being determined to be a duplicate object, and based on the duplicate object, the duplicate object was not stored.

An example method can include receiving an aggregated data object comprising a set of data objects and metadata corresponding to respective data objects of the set of data objects. The method can further include storing the respective data objects to respective storage locations in a set of data blocks stored in data block storage equipment. Further, the method can include updating the metadata to comprise the respective storage locations. The method can further include allocating the metadata to be stored by metadata processing equipment, resulting in the metadata being stored in metadata storage equipment.

Additionally, or alternatively, the metadata can include a first offset value for the respective data objects within the aggregated data object, and the respective storage locations in the set of data blocks can correspond to respective subsets of the set of data objects. Additionally, or alternatively, the respective storage locations in the set of data blocks comprise respective second offset values for the respective subsets of data objects. Additionally, or alternatively, the metadata being stored in metadata storage equipment can include the metadata being stored in a metadata store associated with the set of data blocks. Additionally, or alternatively, the method may include identifying a data object of the set of data objects that is duplicative of another data object stored in the data block storage equipment, and this can result in an identified duplicate object. Based on this identified duplicate object, the system can determine not to store the identified duplicate object.

Additionally, or alternatively, the method may further include identifying, by the system, a data object of the set of data objects that is duplicative of another data object stored in the data block storage equipment, resulting in a duplicate object, determining to store the duplicate object, and storing the metadata in the metadata storage equipment, corresponding to a label that the duplicate object is a duplicate of the data object.

Additionally, or alternatively, the method may further include generating, by the system, the aggregated data object, with the generating including generating the metadata for the respective data objects, based on the metadata and the respective data objects, generating the aggregated data object, and generating a set of instructions, to be processed by the system, applicable to communication of the aggregated data object. Additionally, or alternatively, the set of instructions can include a set of JavaScript object notation entries.

Additionally, or alternatively, the method may further include sending, by the system, the set of instructions to the data block storage equipment that stores the set of data objects. Additionally, or alternatively, an instruction to submit, by the data block storage equipment, application programming interface instructions to communicate the aggregated data object to the system.

An example non-transitory computer-readable medium can include instructions that, in response to execution, cause a system including a processor to perform operations. These operations can include receiving an aggregated data object comprising a set of data objects and metadata corresponding to respective data objects of the set of data objects. The operations can further include storing the respective data objects to respective storage locations in a set of data blocks stored in data block storage equipment. The operations can further include updating the metadata to comprise the respective storage locations. The operations can further include allocating the metadata to be stored by metadata processing equipment, resulting in the metadata being stored in metadata storage equipment.

Additionally, or alternatively, the metadata processing equipment can include multiple processing devices, and the metadata can be processed and stored in parallel via the multiple processing devices. Additionally, or alternatively, the metadata can include a first offset value for the respective ones of the data objects within the aggregated data object, and the respective storage locations in the data blocks can correspond to respective subsets of the data objects. Additionally, or alternatively, the respective storage locations in the data blocks can include respective second offset values for the respective subsets of data objects. Additionally, or alternatively, the metadata to be stored at the metadata storage equipment is to be stored in a metadata store associated with the data blocks.

Other embodiments may become apparent from the following detailed description when taken in conjunction with the drawings.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Generally speaking, one or more embodiments described herein can facilitate writing multiple data objects to object storage. As is understood by one having skill in the relevant art(s), given the description herein, the implementation(s) described herein are non-limiting examples, and variations to the technology can be implemented. For instance, even though many examples described herein discuss cloud storage devices, the technologies described herein can be used in many applicable circumstances, e.g., storing streams data with other types of data storage. As such, any of the embodiments, aspects, concepts, structures, functionalities, implementations and/or examples described herein are non-limiting, and the technologies described and suggested herein can be used in various ways that provide benefits and advantages to data manipulation system technology in general, both for existing technologies and technologies in this and similar areas that are yet to be developed.

Embodiments of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
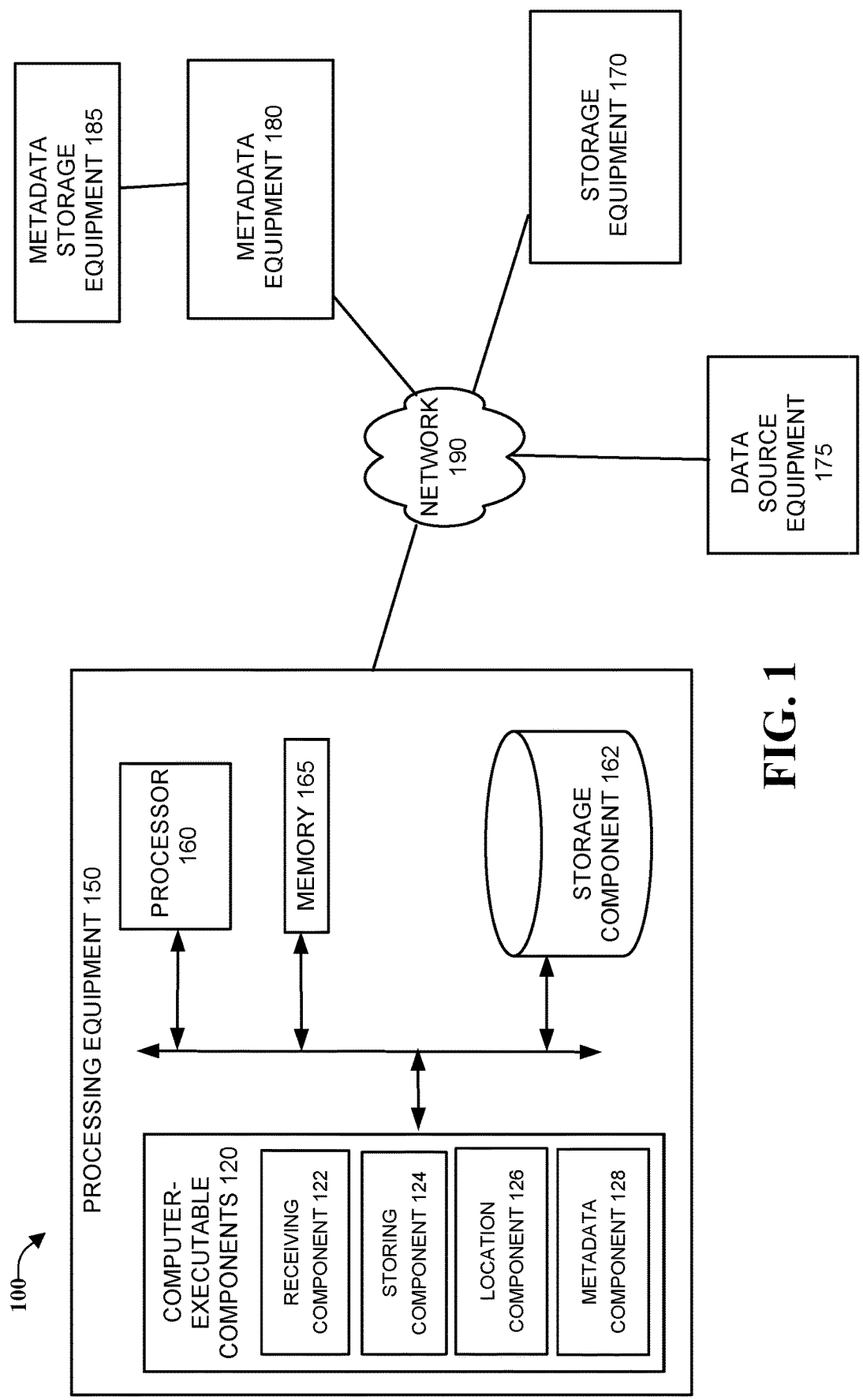
FIG. 1 is an architecture diagram of an example system that can facilitate writing multiple data objects to object storage, in accordance with one or more embodiments.

FIG. 1 is an architecture diagram of an example system 100 that can facilitate writing multiple data objects to object storage, in accordance with one or more embodiments. For purposes of brevity, description of like elements and/or processes employed in other embodiments is omitted. As depicted, system 100 includes processing equipment 150 connected to storage equipment 170, data source equipment 175, and metadata equipment 180, via network 190. Metadata equipment 180 is further connected to metadata storage equipment 185.

As depicted, processing equipment 150 includes memory 165, processor 160, and storage component 162. According to multiple embodiments, memory 165 and storage component 162 of processing equipment 150 can store one or more computer and/or machine readable, writable, and/or executable components 120 and/or instructions. In one or more embodiments, computer-executable components 120, when executed by processor 160, can facilitate performance of operations defined by the executable component(s) and/or instruction(s). Computer executable components 120 can include receiving component 122, storing component 124, location component 126, metadata component 128, and other components described or suggested by different embodiments described herein, that can improve the operation of system 100 or other systems described herein.

According to multiple embodiments, processor 160 can comprise one or more processors and/or electronic circuitry that can implement one or more computer and/or machine readable, writable, and/or executable components and/or instructions that can be stored in memory 165 and storage component 162. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any aspect of any embodiment of the subject disclosure.

As discussed further with FIG. 10 below, network 190 can employ various wired and wireless networking technologies to communicatively connect different elements of different embodiments. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure. In some embodiments, memory 165 can comprise non-volatile random-access memory (NVRAM).

It is understood that the computer processing systems, computer-implemented methods, apparatus, and computer program products described herein employ computer hardware and/or software to solve problems that are highly technical in nature (e.g., utilizing parallel processing to store data in data object form and generate metadata for such stored data), that are not abstract and cannot be performed as a set of mental acts by a human. For example, a human, or even a plurality of humans, cannot efficiently perform the complex and rapid metadata generation and storage of data according to different storage requirements described herein.

In one or more embodiments, data source equipment 175 can be a client of storage processes of system 100, e.g., with data objects needing to be stored in storage equipment 170 along with descriptive metadata stored by metadata storage equipment 185. To handle this processing and storage, one or more embodiments can utilize different aggregation and batch processing approaches to store both the data objects and metadata. One approach used by some embodiments can utilize parallel processing approaches to avoid serial uploading and processing of data objects, e.g., in some circumstances improving the efficiency and performance of handing some types of data objects.

One type of object for which embodiments can improve performance are data objects that are relatively small as compared to other, typical data objects. For example, as a part of operations of data source equipment 175, ten thousand (10,000) relatively small (e.g., 10 KB) objects are to be uploaded to storage equipment 170. Instead of ten thousand transactions, one or more embodiments can process the uploads as a single transaction, e.g., reducing overhead that is tied to a number of transactions. One approach that some embodiments can utilize is combining the number of write operations from one write operation per object to a single write operation for the ten thousand data objects. To further increase system performance, one or more embodiments can utilize parallel metadata processing approaches to handle metadata to be stored. Additional examples of processing and storage of different types of data objects are discussed further below.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of receiving component 122, which can in some implementations, receive an aggregated data object comprising a set of data objects and metadata corresponding to respective data objects of the set of data objects. For example, one or more embodiments, receiving component 122 can receive an aggregated data object from data source equipment 175 that includes a set of data objects and metadata that describes data objects of the set of data objects received from data source equipment 175.

In another example, memory 165 can store executable instructions that can facilitate generation of storing component 124, which can, in some implementations, store the respective data objects to respective storage locations in a set of data blocks stored in data block storage equipment. For example, one or more embodiments, storing component 124 can store the data objects of the aggregated data object received from data source equipment 175 to storage locations in a set of data blocks stored in data block storage equipment, e.g., storage equipment 170.

In another example, memory 165 can store executable instructions that can facilitate generation of location component 126, which can, in some implementations, update the metadata to comprise the respective storage locations. For example, one or more embodiments, location component 126 can update the metadata of the aggregated data object to comprise the respective storage locations at storage equipment 170 used to store the data objects.

In yet another example, memory 165 can store executable instructions that can facilitate generation of metadata component 128, which can, in some implementations, allocate the metadata to be stored by metadata processing equipment, resulting in the metadata being stored in metadata storage equipment. For example, one or more embodiments, metadata component 128 can allocate the metadata to be stored by metadata processing equipment (e.g., metadata equipment 180), resulting in the metadata describing the stored data objects being stored in metadata storage equipment 185.

It is appreciated that the embodiments of the subject disclosure depicted in various figures disclosed herein are for illustration only, and as such, the architecture of such embodiments are not limited to the systems, devices, and/or components depicted therein. For example, in some embodiments, processing equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein, e.g., storage equipment 170, data source equipment 175, metadata equipment 180, metadata storage equipment 185, and other elements described or suggested by embodiments described herein.

It should be noted that processing equipment 150, and other equipment discussed herein, can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as processing equipment 150. For example, one or more of processing equipment 150, storage equipment 170, data source equipment 175, metadata equipment 180, metadata storage equipment 185, and other equipment discussed herein can all be separate subsystems running in the kernel of a computing device as well as operating on separate network equipment, e.g., as depicted in FIG. 1.

Example data storage systems which can employ one or more of the approaches described with embodiments herein include, but are not limited to EMC ISILON®, a non-limiting example network attached storage (NAS) platform provided by DELL EMC, Inc. Example storage array devices which can employ one or more of the approaches described with embodiments herein include, but are not limited to, POWERSCALE® enterprise data storage array system provided by DELL EMC, Inc.

Figure 2:
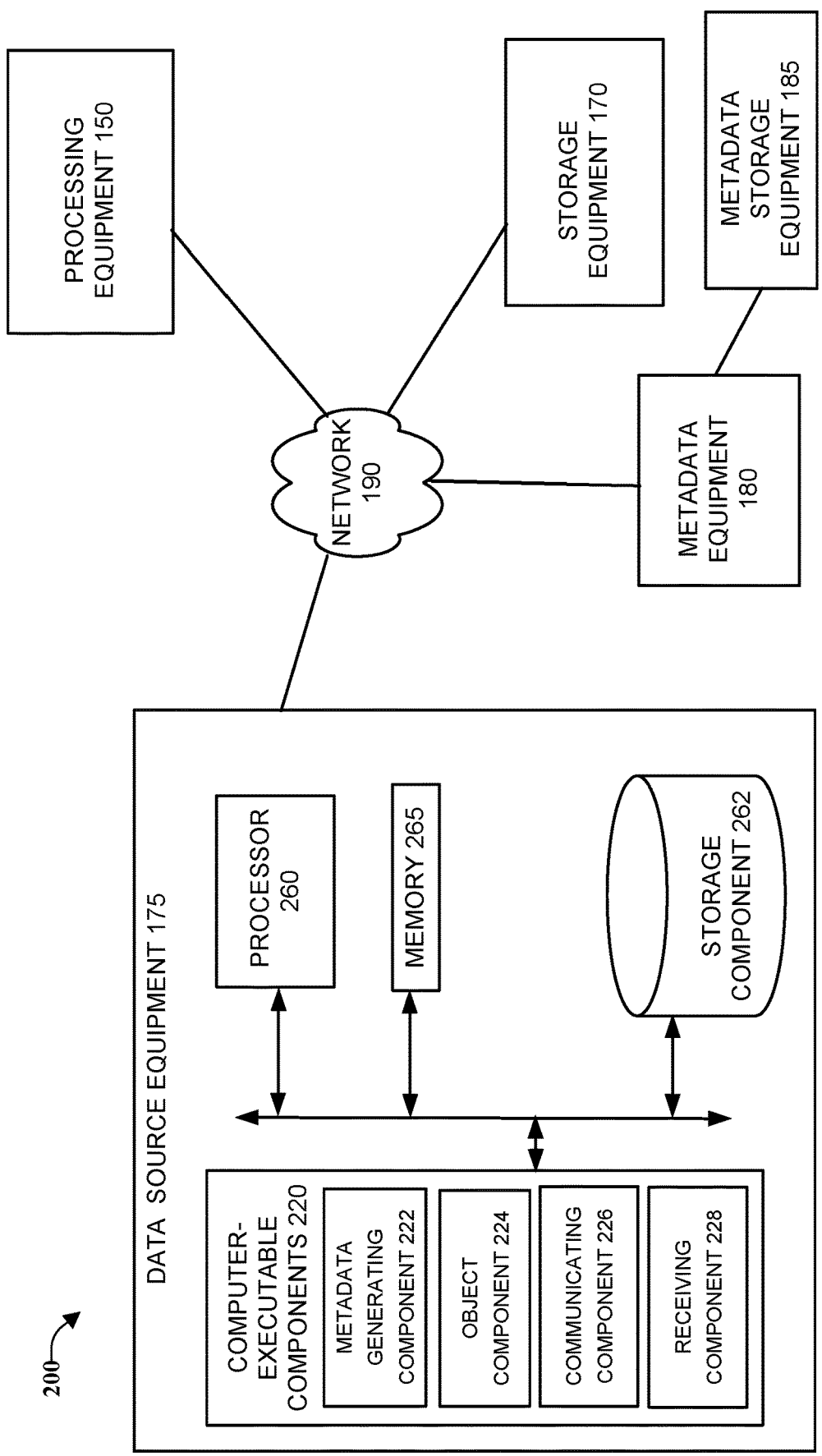
FIG. 2 is an architecture diagram of an example system that can facilitate writing multiple data objects to object storage, in accordance with one or more embodiments.

FIG. 2 is an architecture diagram of an example system 200 that can facilitate writing multiple data objects to object storage, in accordance with one or more embodiments. For purposes of brevity, description of like elements and/or processes employed in other embodiments is omitted. As depicted, system 200 includes data source equipment 175 connected to processing equipment 150, storage equipment 170, and metadata equipment 180, via network 190. Metadata equipment 180 is further connected to metadata storage equipment 185.

As depicted, data source equipment 175 can include processor 260 (e.g., similar to processor 160) and storage device 262 (e.g., similar to storage component 162 with journal 187). According to multiple embodiments, data source equipment 175 can further include memory 265 (similar to memory 165) that can store one or more computer and/or machine readable, writable, and/or executable components 220 and/or instructions that, when executed by processor 260, can facilitate performance of operations defined by the executable component(s) and/or instruction(s). According to multiple embodiments, memory 265 can store one or more computer and/or machine readable, writable, and/or executable components 220 and/or instructions, which can, when executed by processor 260, facilitate performance of operations defined by the executable component including metadata generating component 222, object component 224, communicating component 226, receiving component 228, and other components described or suggested by different embodiments described herein, that can improve the operation of system 200.

In one or more embodiments, computer executable components 220 can be used in connection with implementing one or more of the systems, devices, components, and/or computer-implemented operations shown and described in connection with FIG. 2 or other figures disclosed herein. In an example implementation of data source equipment 175, memory 265 can store executable instructions that can facilitate generation of metadata generating component 222, which in some implementations, can be used to generate metadata for data objects included in the aggregated data object. For example, in one or more embodiments, metadata generating component 222 can generate metadata the aggregated data object provided by data source equipment 175 to processing equipment 150.

In an additional example implementation of data source equipment 175, memory 265 can store executable instructions that can facilitate generation of object component 224, which in some implementations, can, based on the metadata and the data objects of the set of data objects, generate the aggregated data object. For example, in one or more embodiments, object component 224 can, based on the metadata and the data objects of the set of data objects, generate the aggregated data object provided by data source equipment to processing equipment 150.

In an additional example implementation of data source equipment 175, memory 265 can store executable instructions that can facilitate generation of communicating component 226, which in some implementations, can communicate the aggregated data object to a processing device. For example, in one or more embodiments, communicating component 226 can communicate the aggregated data object to processing equipment 150 for processing as described herein.

In an additional example implementation of data source equipment 175, memory 265 can store executable instructions that can facilitate generation of receiving component 228, which in some implementations, can receive, from the processing device, an indication that the aggregated data object was stored by the processing device. In a non-limiting example of this indication, the indication can include that the aggregated data object was stored with updated metadata referencing respective storage locations of the data objects of the set of data objects within the aggregated data object. In addition, this indication can include an indication that the processing device separately stored the metadata of the aggregated data object.

For example, in one or more embodiments, receiving component 228 can receive, from processing equipment 150, an indication that the aggregated data object was stored at storage equipment 170, and that updated metadata referencing respective storage locations of the data objects at storage equipment 170 was stored by metadata equipment 180 at metadata storage equipment 185.

Figure 3:
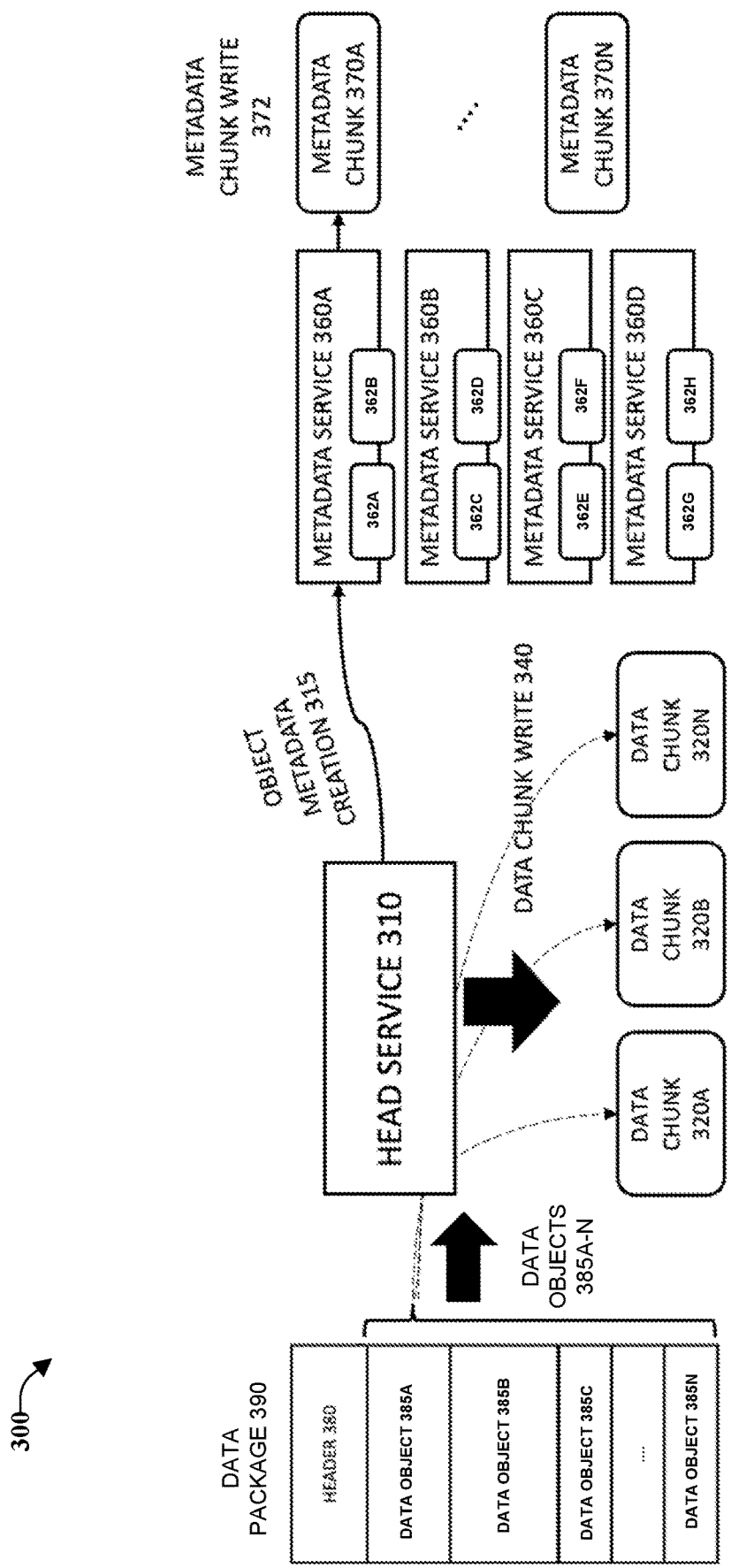
FIG. 3 is an architecture diagram of an example system that can facilitate writing multiple data objects to object storage, in accordance with one or more embodiments.

FIG. 3 is an architecture diagram of an example system 300 that can facilitate writing multiple data objects to object storage, in accordance with one or more embodiments. For purposes of brevity, description of like elements and/or processes employed in other embodiments is omitted. As depicted, system 300 includes data package 390 communicatively coupled to head service 310, which is communicatively coupled to metadata services 360A-D. Data package 390 is depicted as including content such as header 380, and data objects that includes data object 385A, and data object 385B to data object 385N.

As depicted, data package 390 is shown being processed by head service 310 to yield data chunks 320A-N written by data chunk write 340. Metadata services 360A-D are depicted as including metadata processing elements 362A-H, and as yielding by metadata chunk write 372 process, metadata chunks 370A-N.

In one or more embodiments, data storage equipment 175 can provide data package 390 to head service 310 for metadata creation and storage. In this example, data package 390 can be an aggregated data object that includes a set of data objects to be stored by the operation of data storage equipment 175. As depicted in FIG. 3, data package 390 can include header 380 and data objects 385A-N, e.g., with the set of data objects received from data storage equipment 175 respectively corresponding to objects 385A-N. In this example data package 390 can be processed by head service 310, with a data chunk write 340 operation being used to generate data chunks 320A-N and an object metadata creation 315 operation being used to store metadata chunks 370A-N, e.g., at metadata storage equipment 185.

In an example implementation, to generate data package 390, data source equipment 175 can access a directory having many small data objects for uploading, and an application can be executed at data source equipment 175 to generate data package 390 by scanning the data objects, generating user metadata for the data objects, generating a JavaScript object notation (JSON) manifest file, and submitting the manifest file to an application programming interface (API) with the payload of small data objects formatted as a data stream.

In an example implementation of approaches described herein, APIs can be used to batch PUT a large number of small objects in an approach that includes, but is not limited to, accessing and transferring the data objects at relatively high speed compared to other approaches, and accessing an overview of each batch for better management control of the transfer of objects.

In some implementations, the processing of data package 390 by head service 310 can include writing the data objects of data package 390 to data chunks 390A-N. e.g., the data chunks being written all in a single transaction, not one by one in individual transactions. The processing can additionally include sending out child object metadata creation requests to metadata services 360A-D. In one or more embodiments, metadata processing elements 362A-H can process the metadata requests using a consistent hashing algorithm, e.g., no matter how many data objects 385A-N are in data package 390. In some implementations, metadata processing elements 362A-H can support batch operations, e.g., head service 310 can aggregate the requests to be sent to the same metadata processing elements 362A-H into a single batch request. In an approach to facilitating parallel processing, metadata processing elements 362A-H can be distributed in metadata services 360A-D operating on separate processing equipment.

For some of data objects 385A-N processed and stored as data chunks 320A-N by head service 310, the data chunk location of the respective data objects 385A-N can be stored as metadata. For example, data object 385A, received with data object 390, can be stored by head service 310 in data chunks 320A-B, and this can be included as metadata to be identified and stored by metadata service 360A in metadata chunk 370A.

Figure 4:
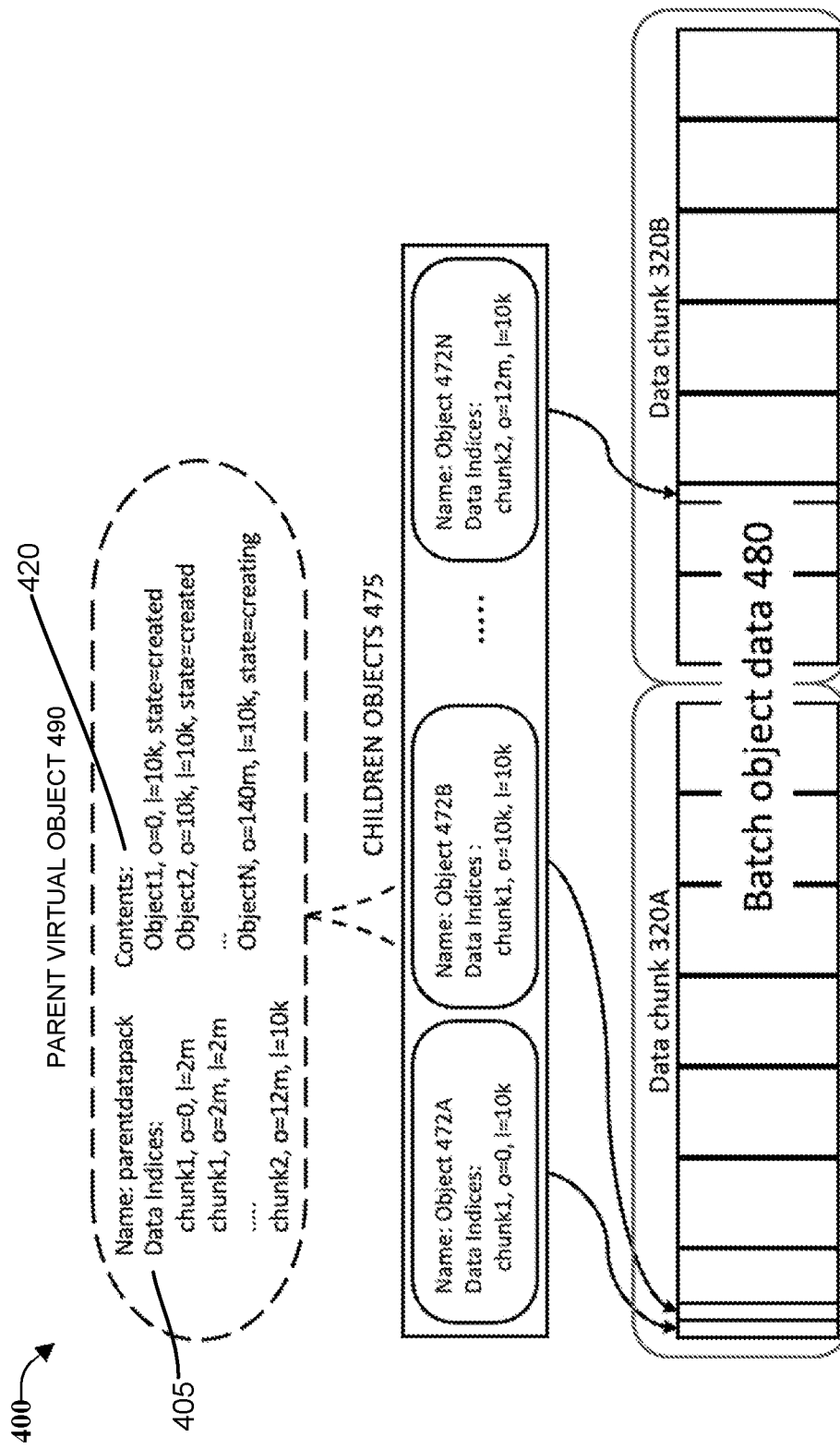
FIG. 4 is a diagram of an example system that can facilitate writing multiple data objects to object storage, in accordance with one or more embodiments.

FIG. 4 is a diagram of an example system 400 that can facilitate writing multiple data objects to object storage, in accordance with one or more embodiments. For purposes of brevity, description of like elements and/or processes employed in other embodiments is omitted.

As depicted, system 400 includes parent virtual object 490, children objects 475, and batch object data 480. Children objects 475 include objects metadata 472A-N and batch object data 480 reside in data chunks 320A-B. In one or more embodiments, as depicted in FIG. 3, data storage equipment 175 can generate and send data package 390 to head service 310, where data package 390 can be stored for processing by head service 310 as parent virtual object 490. In some embodiments, when generating parent virtual object 490 as described herein, head service 310 can analyze the data and generate data indices 405. In addition, parent virtual object 490 is depicted having contents 420.

In one or more embodiments, once parent virtual object 490 has been generated by head service 310, head service 310 can generate children objects 475 that correspond to the data objects of contents 420. In some implementations, to facilitate the generation of metadata chunks 370A-N, head service 310 can communicate children objects 475 to metadata services 360A-D for generation of metadata for metadata chunks 370A-N.

In one or more embodiments, upon the successful creation of children objects 475, parent virtual object 490 can be deleted, e.g., because children objects 475 include references to batch object data 480, deleting parent virtual object 490 will not result in batch object data 480 being lost. In some implementations, this space reclaiming strategy can relatively improve the physical storage efficiency for small object processing as compared to other approaches. Further, the batch transfer approaches described herein can relatively improve the performance of append-only object storage system, e.g., when an application requests to modify or update an existing data object, the new modifications are written in a new chunk, rather than modifying or deleting the previously written data within the chunk.

Additionally, in one or more embodiments, head service 310 can analyze children objects 475 to determine whether any of the objects have already been stored, e.g., in data chunks 320A-B or other data chunks. In one or more embodiments, when an existing object with the same object name is detected, when the storage is version enabled, a new version can be created and stored, e.g., in data chunks 320A-B. Alternatively, when versioning is disabled, an error can be generated and returned, e.g., to data source 175. In some embodiments, upon an error being generated, parent virtual object 490 can either be deleted or maintained. In the API described herein, parent virtual object 490 is set to be deleted by default, but a header flag can be added to a batch PUT statement, e.g., "keepParentOnFailure=true."

Considering the data chunk write process 340 discussed above, in some embodiments, to facilitate writing the data of parent virtual object 490 to data chunks 320A-B, head service can write the data of parent virtual object 490 to data chunks 320A-B, e.g., as batch object data 480. One or more embodiments can update the metadata of children objects 475 to include the respective locations of the stored children objects.

Continuing a discussion of an example API to implement one or more embodiments described herein, the API can provide a read operation for single object during the submission and processing of the batch. For example, in embodiments, any object in the batch can be accessed by referencing a parent and object name, e.g., because embodiments can create metadata for each single object. Thus, the following example API call can be used to retrieve a single object:

GET  https://example.io/mybucket/parentdatapack/object1

Further, in some implementations, an example API call that can be used to track the children object creating progress includes:

GET https://example.io/mybucket/parentdatapack

In this example, because as described above, parent virtual object 490 can be deleted, the transaction is completed the above URL may not be available upon completion.

Figure 5:
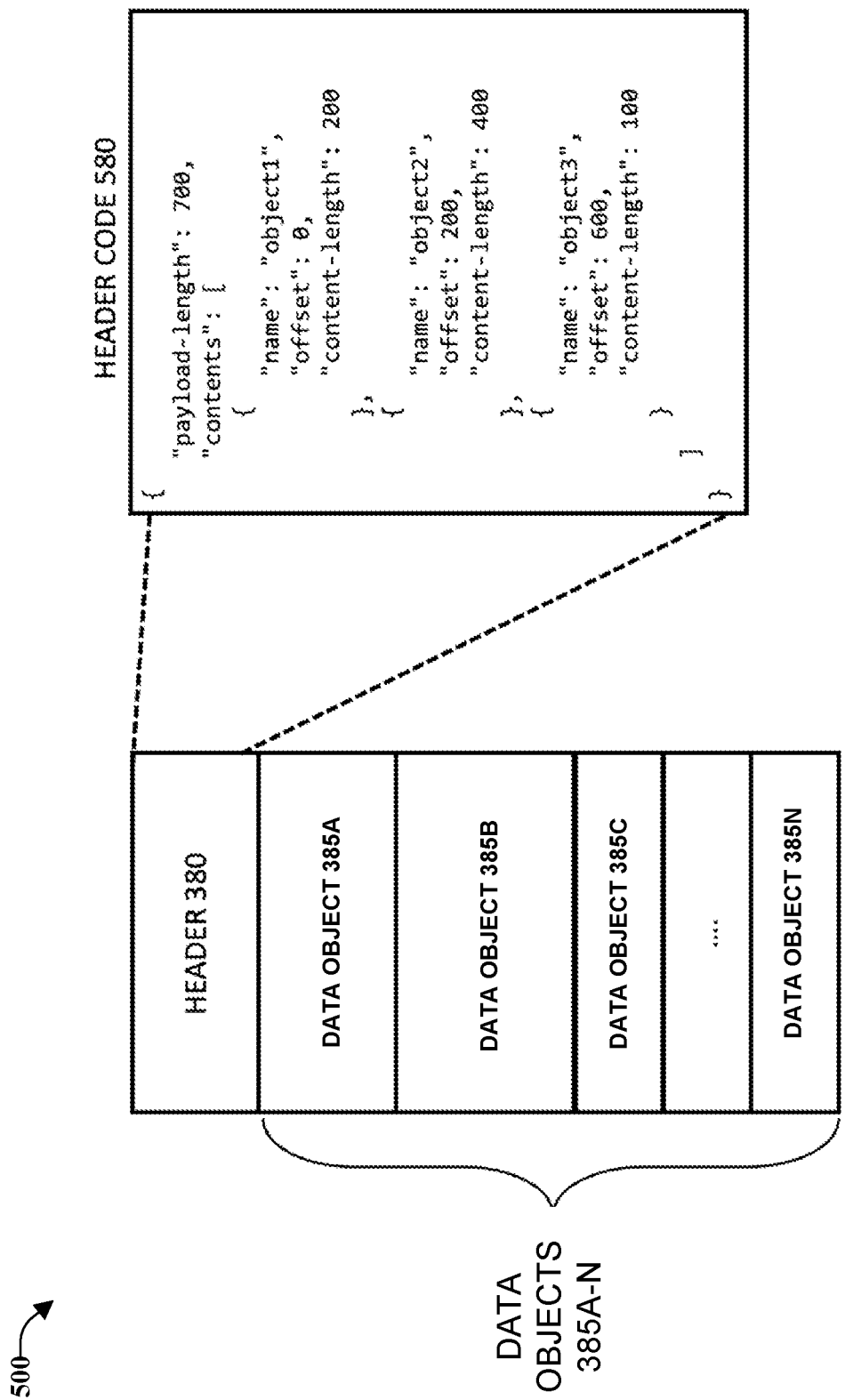
FIG. 5 is a diagram of an example system that can facilitate writing multiple data objects to object storage, in accordance with one or more embodiments.

FIG. 5 is a diagram of an example system 500 that can facilitate writing multiple data objects to object storage, in accordance with one or more embodiments. For purposes of brevity, description of like elements and/or processes employed in other embodiments is omitted. As depicted, system 500 includes a more detailed view of header 380, e.g., header code 580.

In one or more embodiments, to facilitate the processing of data package 390 by head unit 310, header 380 can include information depicted in FIG. 5, corresponding to offsets of respective data objects 385A-N in data package 390.

Figure 6:
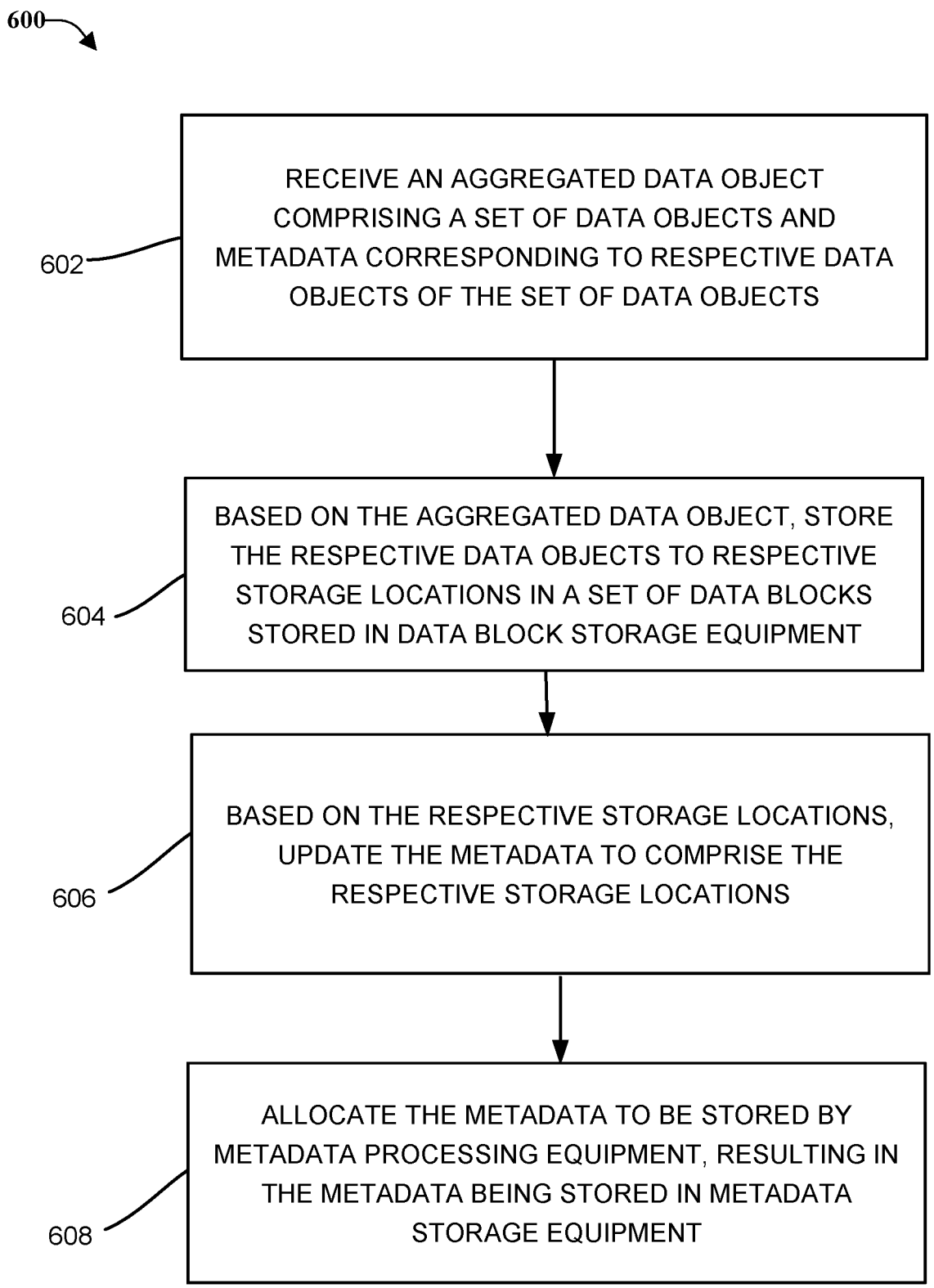
FIG. 6 depicts a flow diagram representing example operations of an example method that can facilitate writing multiple data objects to object storage, in accordance with one or more embodiments.

FIG. 6 depicts a flow diagram representing example operations of an example method 600 that can facilitate writing multiple data objects to object storage, in accordance with one or more embodiments. For purposes of brevity, description of like elements and/or processes employed in other embodiments is omitted.

In some examples, one or more embodiments of method 600 can be implemented by receiving component 122, storing component 124, location component 126, metadata component 128, and other components that can be used to implement part(s) of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602 of method 600, receiving component 122 can, in one or more embodiments, receive an aggregated data object comprising a set of data objects and metadata corresponding to respective data objects of the set of data objects. At 604 of method 600, storing component 124 can, in one or more embodiments, store the respective data objects to respective storage locations in a set of data blocks stored in data block storage equipment. At 606 of method 600, location component 126 can, in one or more embodiments, update the metadata to comprise the respective storage locations. At 608 of method 600, metadata component 128 can, in one or more embodiments, allocate the metadata to be stored by metadata processing equipment, resulting in the metadata being stored in metadata storage equipment.

Figure 7:
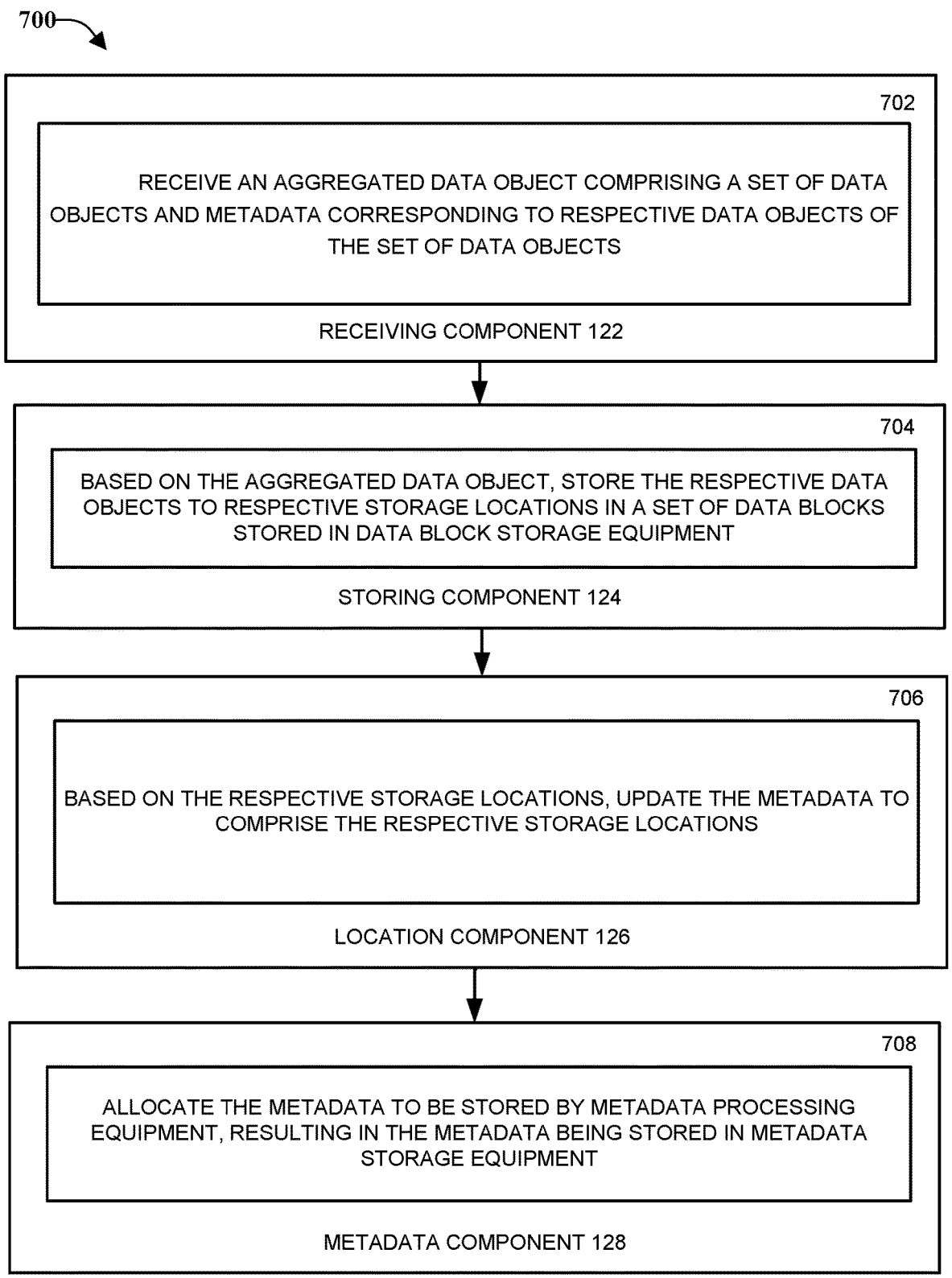
FIG. 7 depicts an example system that can facilitate writing multiple data objects to object storage, in accordance with one or more embodiments.

FIG. 7 depicts an example system 700 that can facilitate writing multiple data objects to object storage, in accordance with one or more embodiments. For purposes of brevity, description of like elements and/or processes employed in other embodiments is omitted. Example system 700 can include receiving component 122, storing component 124, location component 126, metadata component 128, and other components that can be used to implement part(s) of system 800, as described herein, in accordance with one or more embodiments.

At 702 of FIG. 7, receiving component 122 can receive an aggregated data object comprising a set of data objects and metadata corresponding to respective data objects of the set of data objects, in accordance with one or more embodiments. At 704 of FIG. 7, storing component 124 can store the respective data objects to respective storage locations in a set of data blocks stored in data block storage equipment. At 706 of FIG. 7, location component 126 can update the metadata to comprise the respective storage locations. At 706 of FIG. 7, metadata component 128 can allocate the metadata to be stored by metadata processing equipment, resulting in the metadata being stored in metadata storage equipment.

Figure 8:
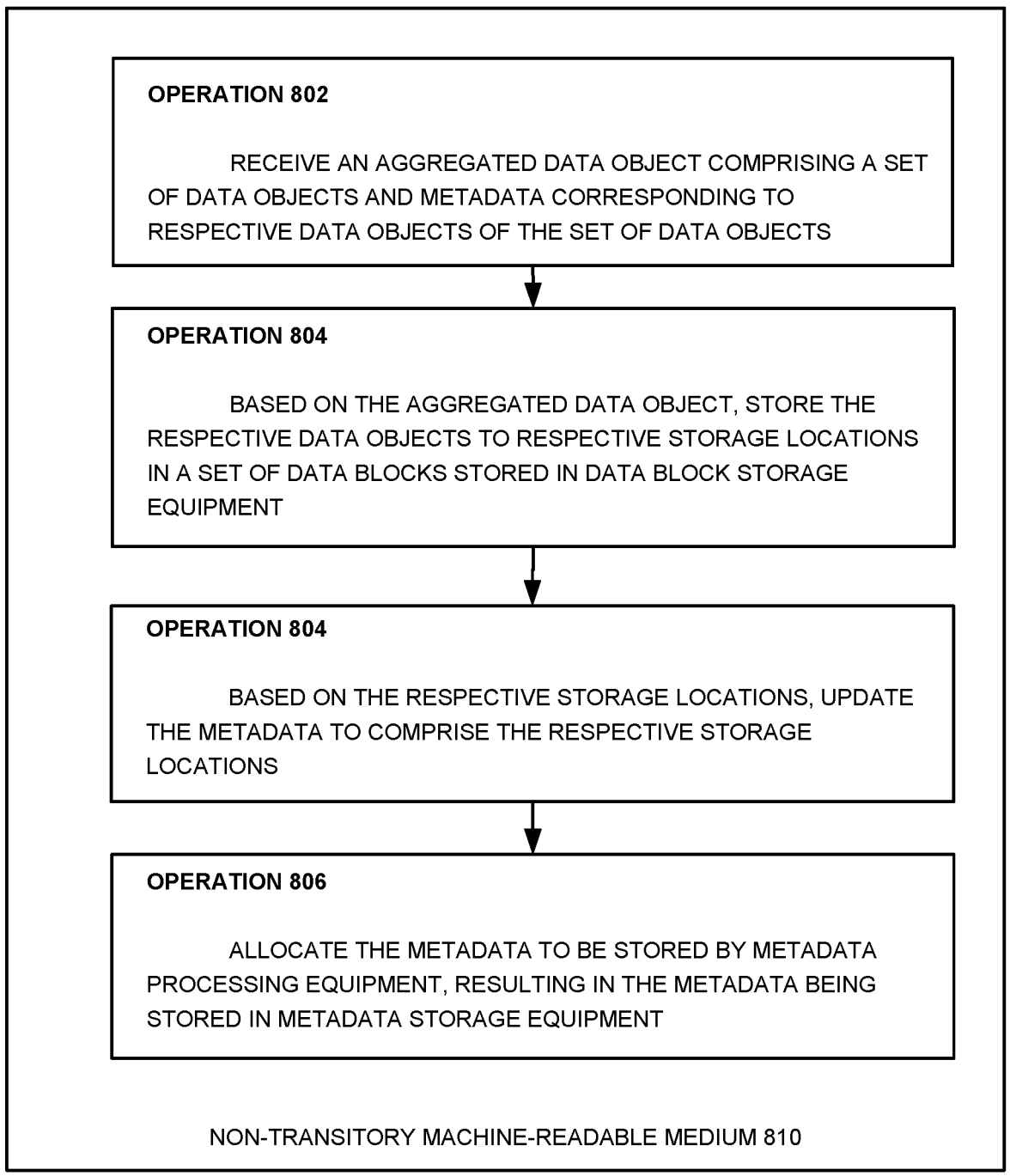
FIG. 8 depicts an example non-transitory machine-readable medium that can include executable instructions that, when executed by a processor of a system, can facilitate writing multiple data objects to object storage, in accordance with one or more embodiments.

FIG. 8 depicts an example 800 non-transitory machine-readable medium 810 that can include executable instructions that, when executed by a processor of a system, can facilitate writing multiple data objects to object storage, in accordance with one or more embodiments. For purposes of brevity, description of like elements and/or processes employed in other embodiments is omitted.

Operation 802 of FIG. 8 can facilitate generation of receiving component 122 which, in one or more embodiments, can receive an aggregated data object comprising a set of data objects and metadata corresponding to respective data objects of the set of data objects. Operation 804 of FIG. 8 can facilitate generation of storing component 124, which, in one or more embodiments, can store the respective data objects to respective storage locations in a set of data blocks stored in data block storage equipment. Operation 806 of FIG. 8 can facilitate generation of location component 126 which, in one or more embodiments can update the metadata to comprise the respective storage locations. Operation 808 of FIG. 8 can facilitate generation of metadata component 128 which, in one or more embodiments can allocate the metadata to be stored by metadata processing equipment, resulting in the metadata being stored in metadata storage equipment.

Figure 9:
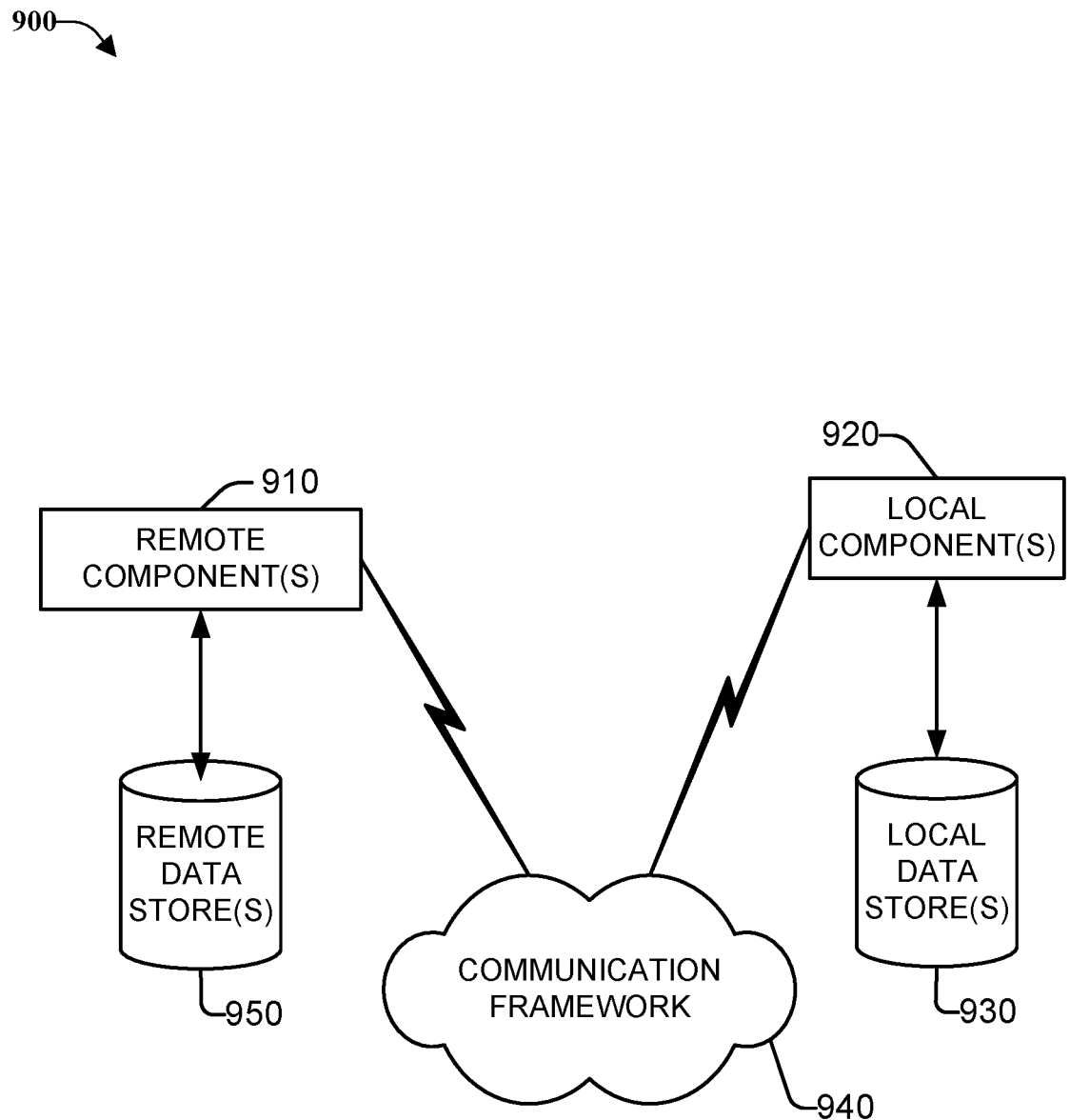
FIG. 9 depicts an example schematic block diagram of a computing environment with which the disclosed subject matter can interact, in accordance with one or more embodiments.

FIG. 9 is a schematic block diagram of a system 900 with which the disclosed subject matter can interact, in accordance with one or more embodiments. The system 900 can include one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also can include one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 can include a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various embodiments of the disclosed subject matter, the following discussion is intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 920, non-volatile memory 922, disk storage 924, and memory storage, e.g., local data store(s) 930 and remote data store(s) 950, for which further description is set forth below.

For instance, non-volatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated embodiments can also be practiced in distributed computing environments where tasks are performed by remote processing devices that are linked through a communications network; however, some if not all embodiments of the subject disclosure can be practiced on stand-alone computers. In a distributed computing environment, program modules can be located in both local and remote memory storage devices.

Figure 10:
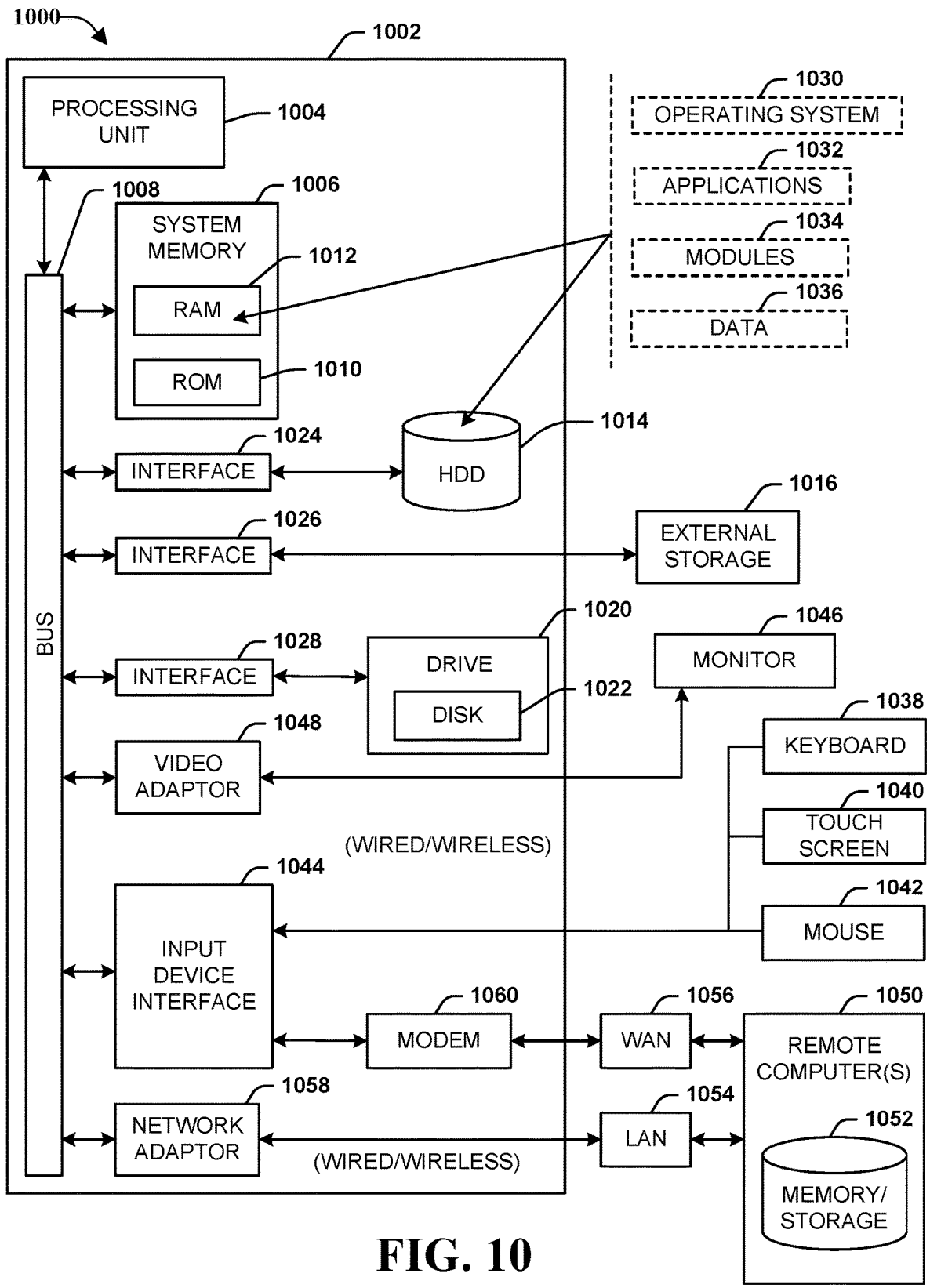
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and non-volatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide non-volatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc. A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations," this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. As mentioned above, it will be appreciated that the memory components, or computer-readable storage media, described herein can be either volatile memory or non-volatile storage, or can include both volatile and non-volatile storage. By way of illustration, and not limitation, non-volatile storage can include ROM, programmable ROM (PROM), EPROM, EEPROM, or flash memory. Volatile memory can include RAM, which acts as external cache memory. By way of illustration and not limitation, RAM can be available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF. THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
facilitating, by a system comprising a processor, receiving an aggregated data object comprising a set of data objects and first metadata corresponding to respective data objects of the set of data objects;
facilitating, by the system, storing the respective data objects in a set of data chunks stored in respective storage locations at data chunk storage equipment, wherein a data chunk of the set of chunks comprises at least two of the respective data objects;
requesting, by the system, generation of respective metadata chunks by the metadata processing equipment, wherein the metadata chunk comprises second metadata comprising the respective storage locations of the at least two respective data objects comprised in the data chunk; and
facilitating, by the system, storing, via the metadata processing equipment, the metadata chunk at metadata chunk storage equipment different from the data chunk storage equipment.

2. The method of claim 1, wherein the second metadata comprises respective offset values for the at least two respective data objects within the data chunk.

3. The method of claim 1, further comprising:
identifying, by the system, a data object of the at least two data objects that is duplicative of another data object stored in the data chunk storage equipment, resulting in an identified duplicate object, and
determining, by the system, not to store data chunks comprising the identified duplicate object at the data chunk storage equipment.

4. The method of claim 1, further comprising:
identifying, by the system, a data object of the set of data objects that is duplicative of another data object stored in the data chunk storage equipment, resulting in an identified duplicate object,
determining, by the system, to store the identified duplicate object, and
facilitating, by the system, storing third metadata corresponding to a label that the identified duplicate object comprises a duplicate of the data object.

5. The method of claim 1, further comprising:
generating, by the system, the aggregated data object, the generating comprising:
generating the first metadata,
based on the first metadata and the respective data objects, generating the aggregated data object, and
generating a set of instructions, to be processed by the system, applicable to communication of the aggregated data object.

6. The method of claim 5, wherein the set of instructions comprises a set of javascript object notation entries.

7. The method of claim 5, further comprising:
communicating, by the system, the set of instructions to the data chunk storage equipment.

8. The method of claim 7, wherein the set of instructions comprises an instruction to submit, by the data chunk storage equipment, application programming interface instructions to communicate the aggregated data object to the system.

9. The method of claim 1, wherein the metadata chunk was generated and stored in parallel via the multiple processing devices.

10. The method of claim 1, wherein the requesting of the generation of the metadata chunk was communicated by message encoded in hypertext transfer protocol.

11. The method of claim 1, further comprising:
after the storing of the respective data objects, removing, by the system, the aggregated data object from storage by the system.

12. The method of claim 1, further comprising:
communicating, by the system, the respective metadata chunks to the metadata processing equipment, wherein the metadata processing equipment generates the metadata chunk based on an analysis of the respective metadata chunks.

13. A network device, comprising
a processor; and
a memory that stores executable instructions that, when executed by the processor, facilitate performance of operations, comprising:
a metadata generator that generates metadata for data objects of a set of data objects,
an object generator that, based on the metadata and the data objects of the set of data objects, generates an aggregated data object,
a communicator that employs a hypertext transfer request to communicate the aggregated data object to a processing device, and
a receiver that receives, from the processing device, an indication that:
the respective data objects of the aggregated data object was stored in data chunks by the processing device with updated metadata referencing respective storage locations of the data objects of the set of data objects within the data chunks, and
a metadata processing device separately stored the metadata of the aggregated data object as a metadata chunk at metadata chunk storage equipment.

14. The network device of claim 13, wherein the metadata comprises a first offset value for the data objects of the set of data objects within the data chunks, and wherein the respective storage locations correspond to respective subsets of the set of data objects stored in respective chunks of the data chunks.

15. The network device of claim 14, wherein the respective storage locations comprise respective second offset values for the respective subsets of data objects within the respective chunks.

16. The network device of claim 13, wherein the indication further comprises indications that:
a data object of the set of data objects was determined to be duplicative of another stored data object, resulting in the data object being determined to be a duplicate object, and
based on the duplicate object, the duplicate object was not stored in the data chunks.

17. A non-transitory machine-readable medium, comprising executable instructions that, when executed by a processor of network equipment, facilitate performance of operations, comprising:
receiving an aggregated data object comprising data objects and metadata corresponding to respective ones of the data objects;
based on the aggregated data object, storing the respective ones of the data objects to respective storage locations in data chunks stored in data chunk server equipment;
based on the respective storage locations, updating the metadata to comprise the respective storage locations of the data objects in the data chunks; and
communicating the metadata as a metadata chunk to metadata processing equipment separate from the network equipment, the metadata to be stored at metadata chunk server equipment, wherein the metadata chunk was communicated to the metadata processing equipment via a hypertext transfer request.

18. The non-transitory machine-readable medium of claim 17, wherein the metadata processing equipment comprises multiple processing devices, and wherein the metadata is processed and stored in parallel via the multiple processing devices.

19. The non-transitory machine-readable medium of claim 17, wherein the metadata comprises an offset value for the respective ones of the data objects within a data chunk of the data chunks, and wherein the respective storage locations correspond to respective subsets of the data objects stored in the data chunk.

20. The non-transitory machine-readable medium of claim 17, wherein the metadata chunk server equipment is associated with the data chunk server equipment.

\* \* \* \* \*